(12) United States Patent
Meylan (10) Patent No.: US 8,687,495 B2
(45) Date of Patent: Apr. 1, 2014

(54) METHOD AND APPARATUS FOR POLLING IN A WIRELESS COMMUNICATION SYSTEM

(75) Inventor: Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1174 days.

(21) Appl. No.: 12/111,811

(22) Filed: Apr. 29, 2008

(65) Prior Publication Data

US 2009/0028126 A1    Jan. 29, 2009

Related U.S. Application Data

(63) Continuation of application No. 12/047,886, filed on Mar. 13, 2008.

(60) Provisional application No. 60/915,426, filed on May 1, 2007, provisional application No. 60/895,394, filed on Mar. 16, 2007, provisional application No. 60/895,451, filed on Mar. 17, 2007.

(51) Int. Cl.
*G01R 31/08* (2006.01)

(52) U.S. Cl.
USPC .............................. 370/236; 370/346; 455/68

(58) Field of Classification Search
USPC .................. 370/346, 216, 470, 474; 455/41.2
See application file for complete search history.

(56) References Cited

U.S. PATENT DOCUMENTS

| 7,450,511 | B2 | 11/2008 | Jang |
| 7,944,944 | B2 * | 5/2011 | Jiang ............................ 370/470 |
| 8,228,917 | B2 | 7/2012 | Vayanos et al. |
| 2004/0143676 | A1 | 7/2004 | Baudry et al. |
| 2006/0056441 | A1 | 3/2006 | Jiang |
| 2006/0285515 | A1 | 12/2006 | Julian et al. |

(Continued)

FOREIGN PATENT DOCUMENTS

| CN | 1691663 A | 11/2005 |
| CN | 1761260 A | 4/2006 |

(Continued)

OTHER PUBLICATIONS

"3rd Generation Partnership Project; Technical Specification Group Radio Access Network; Radio Link Control (RLC) protocol specification (Release 7)", 3GPP TS 25.322 V7.2.0 (Sep. 2006).

(Continued)

*Primary Examiner* — Steven H Nguyen
*Assistant Examiner* — Henry Baron
(74) *Attorney, Agent, or Firm* — Liem T. Do (57) ABSTRACT

A data packet communication system employs radio link control (RLC) transmission between a transmitter and a receiver with an Automatic Repeat Request (ARQ) arrangement whereby polling of the receiver is accomplished with reduced amount of redundantly transmitted data, such as between an access node and terminal. Upon a polling event, such as emptying of a transmission buffer of the transmitter, expiration of a polling timer, or reaching a radio link control (RLC) protocol data units (PDUs) count threshold, the transmitter sends a polling command to the receiver. This polling command is smaller than any of the RLC PDUs by resegmenting to a variably sized PDU sending a reduced amount of data. With evolving communication standards tending toward larger PDUs, such as in excess of a kilobyte for HSPA+ (High-Speed Packet Access Evolution) and 3GPP LTE (Long Term Evolution), this inefficiency can be of increasing impact.

69 Claims, 6 Drawing Sheets

(56) References Cited

U.S. PATENT DOCUMENTS

| | | | |
|---|---|---|---|
| 2007/0054625 A1 | | 3/2007 | Beale |
| 2008/0008152 A1* | | 1/2008 | Lohr et al. .................... 370/342 |
| 2008/0043619 A1* | | 2/2008 | Sammour et al. ............. 370/231 |
| 2008/0064444 A1* | | 3/2008 | Yi .................................. 455/560 |
| 2008/0212561 A1 | | 9/2008 | Pani et al. |
| 2008/0225824 A1 | | 9/2008 | Meylan et al. |
| 2009/0290545 A1 | | 11/2009 | Chun et al. |
| 2011/0110238 A1* | | 5/2011 | Marinier ....................... 370/236 |

FOREIGN PATENT DOCUMENTS

| | | | |
|---|---|---|---|
| EP | 1361689 A1 | 11/2003 | |
| EP | 1494407 A1 | 1/2005 | |
| EP | 1589704 A2 | 10/2005 | |
| EP | 1638237 A2 | 3/2006 | |
| EP | 1755355 | 2/2007 | |
| JP | 2007053747 A | 3/2007 | |
| RU | 2251219 C2 | 4/2005 | |
| RU | 2280958 C2 | 7/2006 | |
| WO | 03047206 A1 | 6/2003 | |
| WO | WO 2006083149 A1 | 8/2006 | |
| WO | 2006118418 | 11/2006 | |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release x8)", 3GPP TS 36.300 V0.123.0 (Oct. 11, 2006).

ETSI TS 125 322 v5.5.0. "Universal Mobile Telecommunications System (UMTS): Radio Link Control (RLC) protocol specification (3GPP TS 25.322 version 5.5.0 Release 5)," 3GPP Technical Specification, vol 3-R2. XP014008755, ISSN: 0000-0001, Jun. 2003.

International Search Report—PCT/US2008/062289, International Searching Authority—European Patent Office—Oct. 15, 2008.

Written Opinion—PCT/US2008/062289, Internatinal Searching Authority—European Patent Office—Oct. 15, 2008.

3GPP TS 36.300 V1.0.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8) (Mar. 2007).

Sheu et al., "An Ack-based polling strategy for supporting high performance and QoS in IEEE 802.11 wireless networks", Computer Communciations, Elsevier Science Publishes BV, Amsterdam, NL, vol. 29, No. 3, Feb. 1, 2006, pp. 358-371.

3GPP: 3rd Generation Partnership Project; Technical Specification Group Radio Access Network; Radio Link Control (RLC) protocol specification (Release 6) TS25.322 V6.9.0,Oct. 17, 2006, p. 51.

3GPP TSG RAN WG2#57bis R2-071370,Fujitsu,RLC header format,Mar. 26, 2007.

3GPP TSG-RAN WG2 #57bis R2-071470,Qualcomm Europe,L2 improvements and polling,Mar. 26, 2007.

3GPP TSG-RAN WG2 #60bis R2-080386,LG Electronics Inc.,Discussion on Poll indication,Jan. 14, 2008.

3GPP TSG-RAN WG2 R2-081124,Motorola,RLC Poll Indication When No Data to Transmit,Feb. 11, 2008.

"3rd Generation Partnership Project; Technical Specification Group Radio Access Network; Evolved Universal Terrestrial Radio Access (E-UTRA) Radio Link Control (RLC) protocol specification (Release 8)", 3GPP TS 36.322 V8.1.0 (Mar. 2008), p. 22-24,25-29.

\* cited by examiner

METHOD AND APPARATUS FOR POLLING IN A WIRELESS COMMUNICATION SYSTEM

CLAIM OF PRIORITY UNDER 35 U.S.C. §119

The present Application for patent claims priority to U.S. patent application Ser. No. 60/915,426, entitled "METHOD AND APPARATUS FOR EFFICIENT RLC POLLING" filed May 1, 2007, assigned to the assignee hereof and hereby expressly incorporated by reference herein.

The present application for patent is a Continuation of U.S. patent application Ser. No. 12/047,886 entitled "METHOD AND APPARATUS FOR POLLING IN A WIRELESS COMMUNICATION SYSTEM" filed Mar. 13, 2008, assigned to the assignee hereof and hereby expressly incorporated by reference herein, which in turn claimed priority to Provisional Application No. 60/895,394 entitled "METHOD AND APPARATUS FOR POLLING IN A WIRELESS COMMUNICATION SYSTEM" filed Mar. 16, 2007, and to Provisional Application No. 60/895,451 entitled "METHOD AND APPARATUS FOR POLLING IN A WIRELESS COMMUNICATION SYSTEM" filed Mar. 17, 2007, both assigned to the assignee hereof and hereby expressly incorporated by reference herein.

FIELD OF INVENTION

The present description pertains to data packet transmission from a transmitter to a receiver with a radio access network for reliable acknowledged communication.

BACKGROUND

The layer two specification of the 3GPP (Third Generation Partnership Project) series of specifications features an Automatic Repeat Request (ARQ) mechanism as part of the Radio Link Control (RLC) protocol. When RLC creates Protocol Data Units (PDU), data is submitted to the lower layer and buffered until its reception is acknowledged by the receiver or the discard timer orders to discard the PDU. A monotonically increasing sequence number is assigned to each PDU allowing the receiver to re-order the stream of received PDUs as well as detect missing packets in the received sequence.

RLC specifies packet formats and procedures to carry buffer status information from the receiver via a STATUS PDU as well as a procedure for the transmitter to request that information, which is performed by setting a specified "Poll" bit in selected RLC PDUs.

Various timers and events trigger the transmission of either a Poll or a STATUS control commands. For instance, the transmitter may send a Poll command at periodic intervals, every time N PDUs are transmitted, or whenever the last data in the RLC buffer is transmitted. The receiver may send a STATUS PDU in response to a Poll command, autonomously at periodic intervals (i.e., every time N PDUs are received), or whenever a missing PDU is detected because of a hole in the sequence numbers.

When the transmitter is to send a Poll, the transmitter selects a RLC PDU that is not yet acknowledged and retransmits the PDU with the Poll bit set to "1" in order to convey the Poll command to the receiver. An example of such an implementation is in Universal Mobile Telecommunication System (UMTS) release 5. Changes in the system architecture of both HSPA+ (High-Speed Packet Access Evolution) and 3GPP LTE (Third Generation Partnership Program Long Term Evolution) are to support larger PDUs in order to reduce the overheads. While retransmitting a complete PDU may have been a satisfactory solution for PDUs of modest size, it may become wasteful to retransmit a large PDU in the newer systems.

SUMMARY

The following presents a simplified, summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with a data packet transmission approach wherein polling requests are transmitted in a form that reduces a requirement to retransmit user data and thus increase data efficiency.

In one aspect a method is provided for reliable transmission from a local transmitter to a remote receiver with reduced transmission of data. A radio link control command is transmitted from a local transmitter to a remote receiver. A polling command is transmitted by transmission of a reduced amount of user-plane data and a poll indication in response to detecting a polling event. In response, a status PDU is received.

In another aspect, at least one processor is provided for reliable transmission from a local transmitter to a remote receiver with reduced transmission of data. A first module transmits radio link control command from a local transmitter to a remote receiver. A second module transmits a polling command by transmission of a reduced amount of user-plane data and a poll indication in response to detecting a polling event. In addition, a third module receives a status PDU.

In an additional aspect, a computer program product is provided for reliable transmission from a local transmitter to a remote receiver with reduced transmission of data. A computer readable medium comprises sets of codes for causing a computer to transmit radio link control command from a local transmitter to a remote receiver, to transmit a polling command by transmission of a reduced amount of user-plane data and a poll indication in response to detecting a polling event, and to receive a status PDU.

In a further aspect, an apparatus is provided for reliable transmission from a local transmitter to a remote receiver with reduced transmission of data by having means for transmitting radio link control command from a local transmitter to a remote receiver, means for transmitting a polling command by transmission of a reduced amount of user-plane data and a poll indication in response to detecting a polling event, and means for receiving a status PDU.

In another additional aspect, an apparatus is provided for reliable transmission from a local transmitter to a remote receiver with reduced transmission of data. A local transmitter transmitting radio link control command to a remote receiver. A polling component transmits a polling command via the local transmitter by transmission of a reduced amount of user-plane data and a poll indication in response to detecting a polling event. A local receiver receives a status PDU.

In yet one other aspect, a method is provided for reliable transmission from a remote transmitter to a local receiver with reduced transmission of data. A radio link control command is received from a remote transmitter to a local receiver. A polling command is received by transmission of a reduced amount of user-plane data and a poll indication in response to detecting a polling event. A status PDU is transmitted.

In yet another aspect, at least one processor is provided for reliable transmission from a remote transmitter to a local receiver with reduced transmission of data. A first module receives radio link control command from a remote transmitter to a local receiver. A second module receives a polling command by transmission of a reduced amount of user-plane data and a poll indication in response to detecting a polling event. A third module transmits a status PDU.

In yet an additional aspect, a computer program product is provided for reliable transmission from a remote transmitter to a local receiver with reduced transmission of data. A computer readable medium comprises sets of codes for causing a computer to receive radio link control command from a remote transmitter to a local receiver, to receive a polling command by transmission of a reduced amount of user-plane data and a poll indication in response to detecting a polling event, and to transmit a status PDU.

In yet a further aspect, an apparatus is provided for reliable transmission from a remote transmitter to a local receiver with reduced transmission of data by having means for receiving radio link control command from a remote transmitter to a local receiver, means for receiving a polling command by transmission of a reduced amount of user-plane data and a poll indication in response to detecting a polling event, and means for transmitting a status PDU.

In yet a further additional aspect, an apparatus is provided for reliable transmission from a remote transmitter to a local receiver with reduced transmission of data. A local receiver for receiving radio link control command to a remote receiver. A polling component receives a polling command via the local receiver having transmission of a reduced amount of user-plane data and a poll indication in response to detecting a polling event. A local transmitter transmits a status PDU.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

A data packet communication system employs a Radio Link Control protocol for transmission between a transmitter and a receiver. The Radio Link Control provides with an Automatic Repeat Request (ARQ) featuring lossless delivery service by means of request for receiver startus and retransmission of lost data. The request for receiver status is referred to as polling and an arrangement whereby polling of the receiver is accomplished with a reduced amount of potentially redundant transmitted data is described. Upon a polling event, such as emptying of a transmission buffer of the transmitter, expiration of a polling timer, reaching an RLC protocol data units (PDUs) count threshold or reaching a number of outstanding transmitted byte-threshold, the transmitter sends a polling command to the receiver. This polling command may be smaller than any of the RLC PDUs by segmenting or re-segmenting an already transmitted PDU to a variably sized PDU sending a reduced amount of data. Segmenting is the operation of transmitting a subset of an already formed PDU. Re-segmenting is the operation of segmenting a segment of an already formed PDU. For the sake of generality we will use re-segment to refer to either a segment or re-segment. Thus, use of a polling command avoids using the convention approach of resending a full RLC PDU with a polling bit set to evoke a STATUS PDU from the access terminal. With evolving communication standards tending toward larger PDUs, such as in excess of a kilobyte for HSPA+ (High-Speed Packet Access Evolution) and 3GPP LTE (i.e., Long Term Evolution (LTE)), this inefficiency can be of increasing impact.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Figure 1:
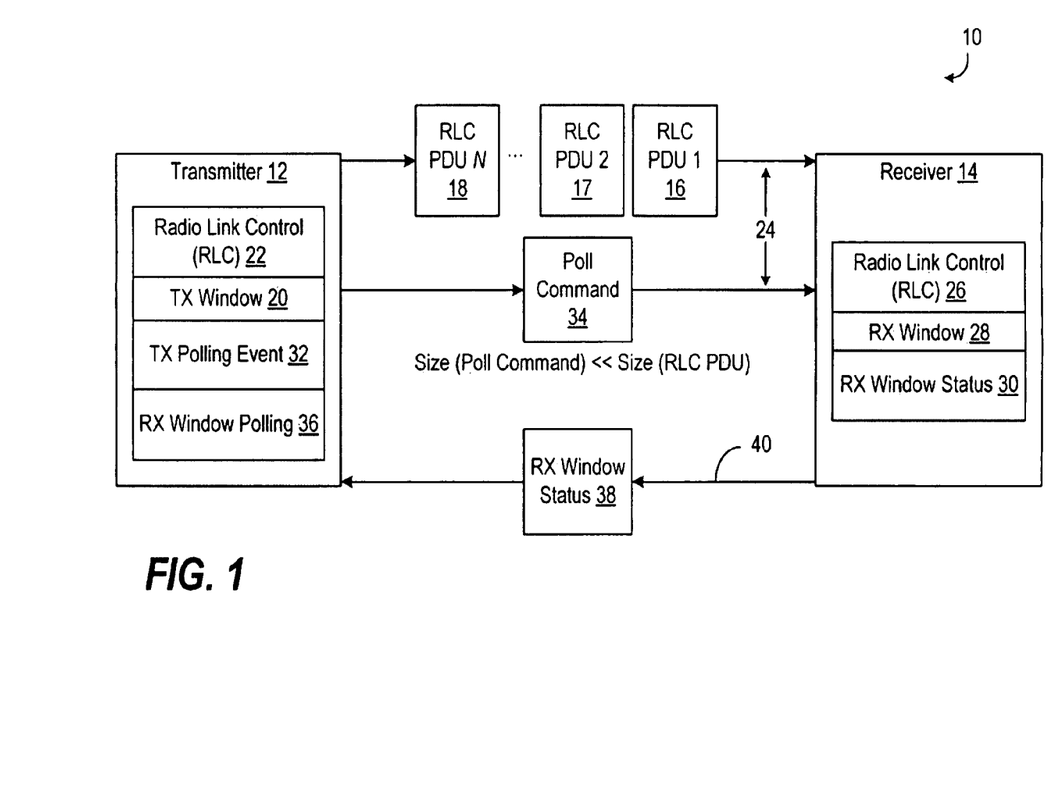
FIG. 1 illustrates a block diagram of a communication system for reliable acknowledged data packet transmission by a transmitter and reception by a receiver.

Turning to the Drawings, in FIG. 1, a communication system 10 provides reliable data packet transmission from an transmitter 12 to a receiver 14. User data is segmented into a plurality of Radio Link Control (RLC) PDUs 16, 17, 18 that are stored in a transmitter (TX) window 20 until transmitted by a Radio Link Control 22 across a link 24 to be received by the receiver 14, whose RLC 26 stores the received RLC PDUs 16-18 in an RX window 28 for processing with signaling status tracked by an RX window status component 36. A TX window poll event (e.g., timer) component 32 of the transmitter 12 determines a need for a status of the RX window of the receiver 14. A poll command message 34 is prepared by an RX window polling component 36 and sent over the link 24 to the receiver 14, which in turn responds with an RX window status 38 over an uplink 40.

It should be appreciated with the benefit of the present disclosure that a radio link control is a protocol in the 'layer two' of a telecommunication system that, among other things enable ARQ (Automatic Repeat re-Quest) as for example the RLC of HSPA and the RLC of LTE in 3GPP. Furthermore, the techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). These various radio technologies and standards are known in the art.

It should be appreciated with the benefit of the present disclosure that prior to the evolutions being brought by HSPA+ and LTE, RLC segmented user data into fixed size PDUs; for instance 20, 40 or 80 bytes. Because of this, it is appreciated that in order to initiate a polling after the transmit buffer is emptied, one PDU of ~20, 40 or 80 bytes needs to be re-transmitted with the Poll bit set. However, this method introduces overheads that are not significant compared to the size of the user's payload.

Communication protocols for HSPA+ and LTE allow variable size RLC PDUs in order to improve the protocol efficiency and reduce processing. RLC PDU size is now selected according to the size of the transport block allocated on the channel. Given the very high throughputs enabled at the physical layer, the size of RLC PDU can be in excess of a kilobyte. Without modification of the existing specifications, it is appreciated that RLC would need to transmit one such possibly large RLC PDU in order to poll receiver. Various aspects relate to initiating a poll in a wireless communication system that minimizes the overhead necessary for communicating the polling information. Particularly, one aspect relates to communicating poll information without requiring retransmission of previously transmitted user data. Discussed below are various methods for communicating poll information that are more efficient than current methods.

Figure 2:
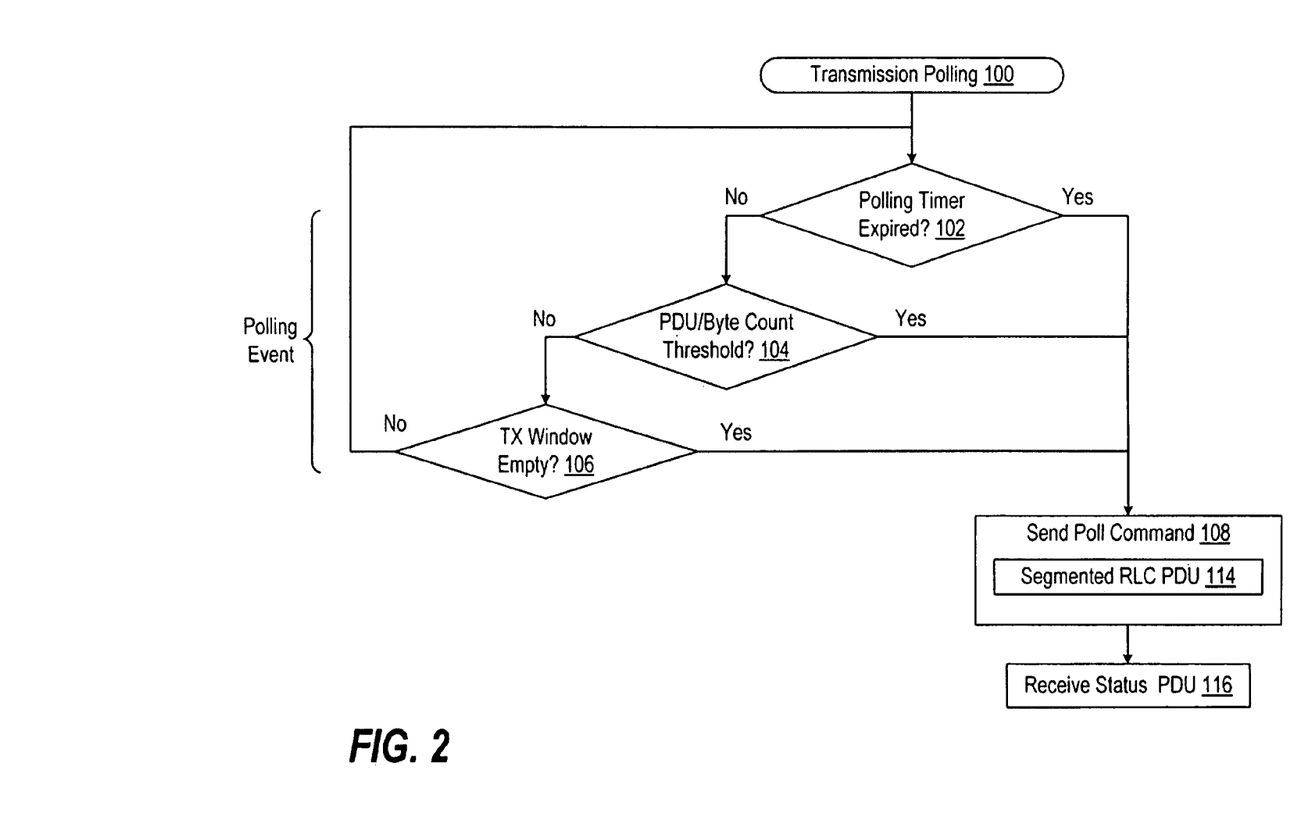
FIG. 2 illustrates a flow diagram for a methodology for reliable transmission utilizing a polling command.

In FIG. 2, a methodology 100 for transmission polling depicts a plurality of ways of detecting a poll event as well as a plurality of ways for formatting a poll command 34, rather than retransmitting an RLC PDU 16-18, for increased data transmission efficiency. Each type of poll command 34, used alternatively or selectively, is substantially smaller than the RLC PDUs 16-18. In block 102, a determination is made as to whether the polling event is the expiration of a polling timer. If not, then a further determination is made in block 104 as to whether a PDU count or byte count threshold have been met. If not, yet a further determination is made in block 106 as to whether a transmitter (TX) window is empty. It should be noted that this invention could be applied irrespective of which polling event is used to initiate the polling command. The invention applies to other polling events that may be defined in the future. If not, the process returns to block 102 to continue waiting for a polling event to be detected. It should be appreciated that only one or two such events may be monitored.

If any of the polling events are detected, for instance in block 102, 104, 106, then a send poll command is performed in block 108. In the illustrative version, a poll command 34 is described as a segmented or resegmented RLC PDU with a polling indication set (block 114). Then the transmitter receives the response from the receiver, which is a Status PDU in block 116.

Figure 3:
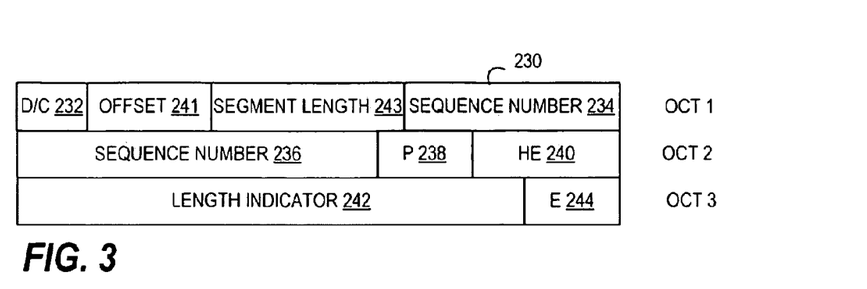
FIG. 3 illustrates a block diagram of an illustrative data structure of an RCL AM Data (AMD) PDU of another aspect.

Poll with zero or more length RLC AM Data (AMD) PDU. An RLC AMD PDU format can be adapted to facilitate a resegmented AMD PDU 230 that contains no data or less data than the already formed PDU. Data information from a higher layer is called an AM Data (AMD). FIG. 3 depicts an illustrative general format of an AMD PDU 230 to transport re-segmented data with a D/C bit 232 and sequence number field 234 in the first octet, a sequence number field 236, a poll bit 238, and two-bit HE field 240 in the second octet that indicates whether the next octet is header information (LI) or data, and a length indicator field 242 and one-bit E (Extension) field 244 in the third octet that indicates whether the next octet is header or data. The header includes segment offset, depicted at 241, that indicates the position of the re-segmented data within the already formed PDU. The header may include segment length, depicted at 243, which indicates the amount of re-segmented data.

If the highest transmitted sequence number is N, the Poll command may be conveyed to the receiver by setting the Poll bit to "1" on a RLC AMD PDU 210 with a payload of length "0". The length indicator may be set to "0". The receiver interprets a PDU with zero data and poll bit set as a polling command and does not attempt to store the received PDU in its receive buffers. Depending on specific semantics, the highest sequence number along with poll command may be indicated by setting the sequence number in the PDU to N+1 or N+d, where d is an integer.

It should be appreciated, however, that the receiver procedures can be modified to cope with the reception of an empty AMD PDU as mentioned above.

Figure 4:
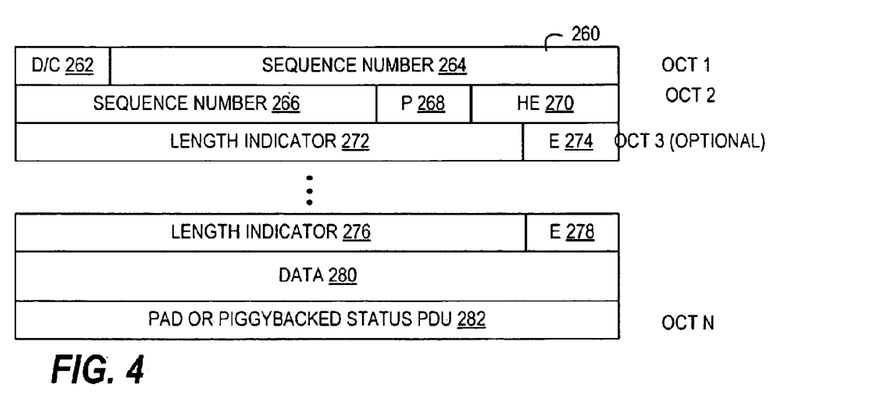
FIG. 4 illustrates a block diagram of a data PDU used to communicate poll information according to a further aspect.

An RLC AMD PDU 260 used to convey the Poll command is shown by way of example in FIG. 4. A first octet is depicted as comprising a D/C bit 262 and a sequence number field 264. A second octet is comprised of a sequence number field 266, a poll bit 268, and an HE field 270. A third octet, which is optional, is comprised of a length indicator field 272 and an E bit 274. An N−2 octet includes a length indicator field 276 and an E field 278. An N−1 octet includes data 280. An N octet has pad or piggybacked status PDU field 282.

Aspects of the present invention may be related to systems implementing any version of the Radio Link Control (RLC) protocol specification, including but not limited to the Radio Link Control (RLC) protocol specification Release 7 3GPP TS 25.322 and Specification Group Radio Access Network; Evolved Universal Terrestrial Radio Access (E-UTRA) and Evolved Universal Terrestrial Radio Access Network (E-UTRAN); Radio Link Control (RLC) protocol specification Release 8 3GPP TS 36.322. It should be appreciated however that various aspects may be applicable to other types of networks.

It should be appreciated that wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out (SISO), multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beam forming gain on the forward link when multiple antennas are available at the access point.

Figure 5:
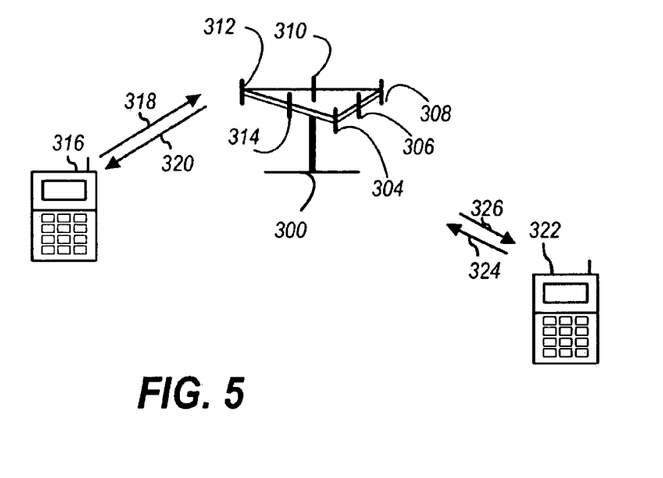
FIG. 5 illustrates a diagram of a multiple access wireless communication system according to one aspect for supporting polling commands.

Referring to FIG. 5, a multiple access wireless communication system according to one aspect is illustrated. An access point 300 (AP) includes multiple antenna groups, one including 304 and 306, another including 308 and 310, and an additional including 312 and 314. In FIG. 5, only two antennas are shown for each antenna group, however, more or fewer antennas may be utilized for each antenna group. Access terminal 316 (AT) is in communication with antennas 312 and 314, where antennas 312 and 314 transmit information to access terminal 316 over forward link 320 and receive information from access terminal 316 over reverse link 318. Access terminal 322 is in communication with antennas 306 and 308, where antennas 306 and 308 transmit information to access terminal 322 over forward link 326 and receive information from access terminal 322 over reverse link 324. In a FDD system, communication links 318, 320, 324 and 326 may use different frequency for communication. For example, forward link 320 may use a different frequency then that used by reverse link 318.

Each group of antennas and/or the area in which they are designed to communicate is often referred to as a sector of the access point. In the aspect, antenna groups each are designed to communicate to access terminals in a sector of the areas covered by access point 300.

In communication over forward links 320 and 326, the transmitting antennas of access point 300 utilize beam forming in order to improve the signal-to-noise ratio of forward links for the different access terminals 316 and 324. In addition, an access point using beam forming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 6:
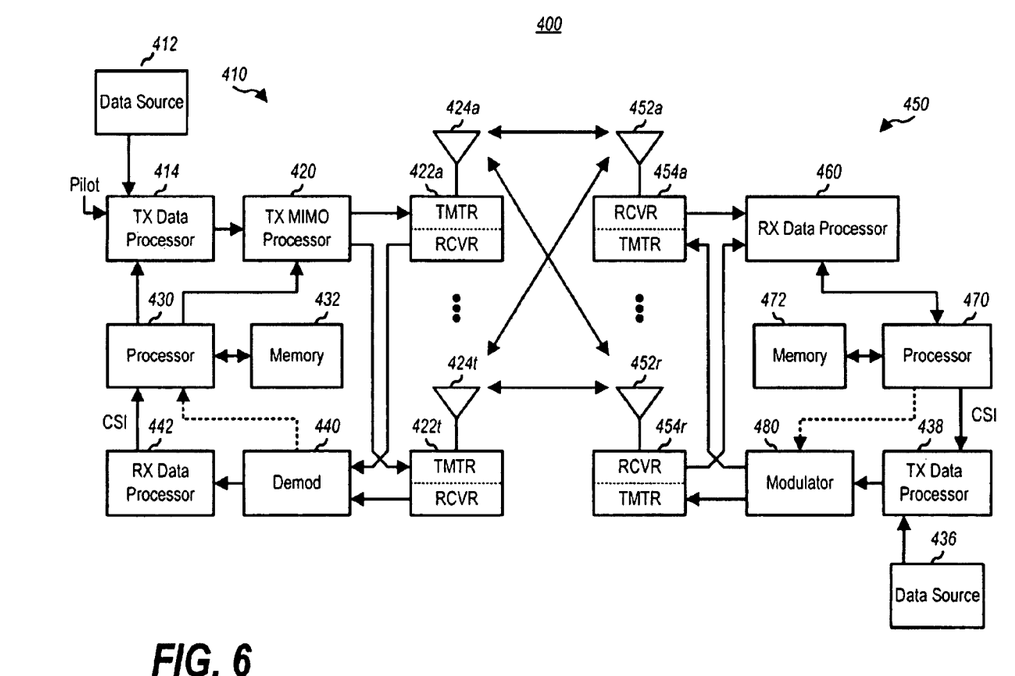
FIG. 6 illustrates a schematic block diagram of a communication system for supporting polling commands.

FIG. 6 is a block diagram of an aspect of a transmitter system 410 (also known as the access point) and a receiver system 450 (also known as access terminal) in a MIMO system 400. At the transmitter system 410, traffic data for a number of data streams is provided from a data source 412 to a transmit (TX) data processor 414.

In an aspect, each data stream is transmitted over a respective transmit antenna. TX data processor 414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 430.

The modulation symbols for all data streams are then provided to a TX MIMO processor 420, which may further process the modulation symbols (e.g., for OFDM). TX MIMO processor 420 then provides $N_T$ modulation symbol streams to $N_T$ transmitters (TMTR) 422a through 422t. In certain implementations, TX MIMO processor 420 applies beam-forming weights to the symbols of the data streams and to the antenna from which the symbol is being transmitted.

Each transmitter 422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 422a through 422t are then transmitted from $N_T$ antennas 424a through 424t, respectively.

At receiver system 450, the transmitted modulated signals are received by $N_R$ antennas 452a through 452r and the received signal from each antenna 452 is provided to a respective receiver (RCVR) 454a through 454r. Each receiver 454 conditions (e.g., filters, amplifies, and downconverts) a respective received signal, digitizes the conditioned signal to provide samples, and further processes the samples to provide a corresponding "received" symbol stream.

An RX data processor 460 then receives and processes the $N_R$ received symbol streams from $N_R$ receivers 454 based on a particular receiver processing technique to provide $N_T$ "detected" symbol streams. The RX data processor 460 then demodulates, deinterleaves, and decodes each detected symbol stream to recover the traffic data for the data stream. The processing by RX data processor 460 is complementary to that performed by TX. MIMO processor 420 and TX data processor 414 at transmitter system 410.

A processor 470 periodically determines which pre-coding matrix to use (discussed below). Processor 470 formulates a reverse link message comprising a matrix index portion and a rank value portion.

The reverse link message may comprise various types of information regarding the communication link and/or the received data stream. The reverse link message is then processed by a TX data processor 438, which also receives traffic data for a number of data streams from a data source 436, modulated by a modulator 480, conditioned by transmitters 454a through 454r, and transmitted back to transmitter system 410.

At transmitter system 410, the modulated signals from receiver system 450 are received by antennas 424, conditioned by receivers 422, demodulated by a demodulator 440, and processed by a RX data processor 442 to extract the reserve link message transmitted by the receiver system 450. Processor 430 then determines which pre-coding matrix to use for determining the beam forming weights then processes the extracted message.

In an aspect, logical channels are classified into Control Channels and Traffic Channels. Logical Control Channels comprises Broadcast Control Channel (BCCH), is DL channel for broadcasting system control information. Paging Control Channel (PCCH), is DL channel that transfers paging information. Multicast Control Channel (MCCH) is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH), which is Point-to-point bi-directional channel, dedicated to one UE, for the transfer of user information. In addition, a Multicast Traffic Channel (MTCH) is Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); Load Indicator Channel (LICH); The UL PHY Channels comprises: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); Broadband Pilot Channel (BPlCH).

Figure 7:
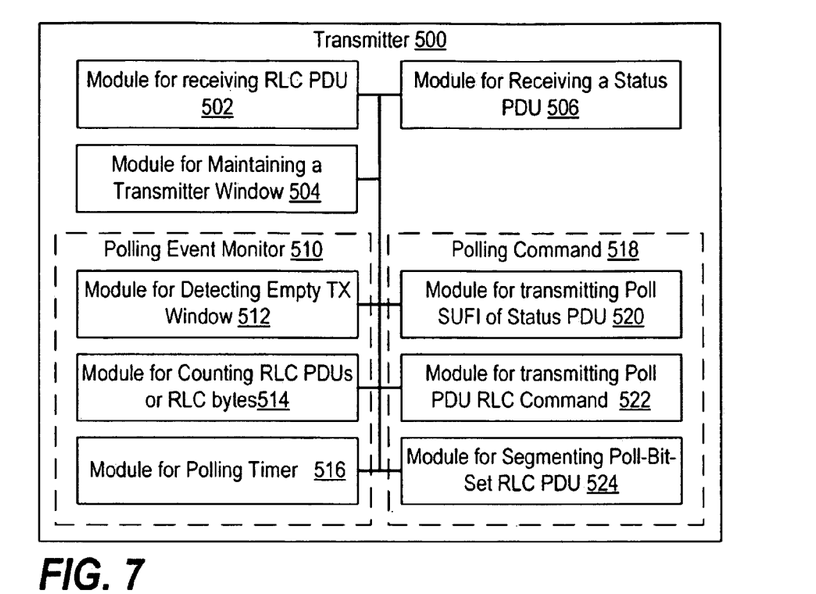
FIG. 7 illustrates a block diagram for a transmitter having modules for sending a polling command to a receiver.

In FIG. 7, a transmitter 500 includes means, depicted as a module 502, for receiving a plurality of RLC PDUs. The transmitter 500 includes a means, depicted as a module 504, for maintaining a transmitter window. The transmitter 500 includes a means, depicted as a module 506, for receiving a Status PDU from the receiver. The transmitter 500 includes a means, depicted as function 510 for monitoring for a polling event that includes one or more three illustrative modules. First, a module 512 is provided for detecting an empty transmitter window. Second, a module 514 is provided for counting RLC PDUs or RLC outstanding bytes to detect reaching a threshold. Third, a module 516 is provided for a polling timer. The transmitter 500 includes a function 518 for creating a polling command that includes one or more of three illustrative modules. First, a module 520 is provided for transmitting a poll super field (SUFI) incorporated into a Status PDU. Second, a module 522 is provided for transmitting a Polling PDU RLC command. Third, a module 524 is provided for segmenting a RLC PDU with no data and the poll bit set.

Figure 8:
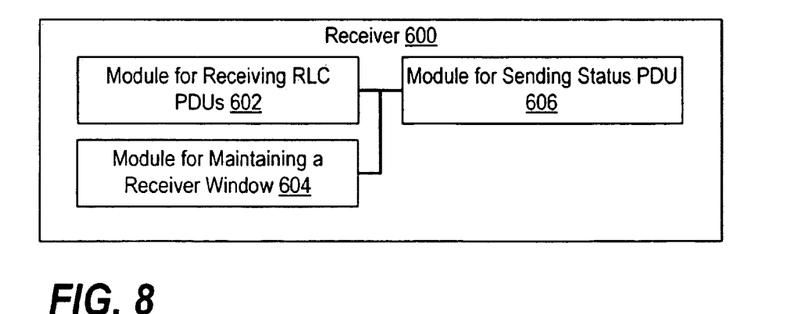
FIG. 8 illustrates a block diagram for a receiver having modules for receiving a polling command and responding with a status PDU.

In FIG. 8, a receiver 600 includes means, depicted as a module 602, for receiving a plurality of RLC PDUs. The receiver 600 includes a means, depicted as a module 604, for maintaining a receiver window. The receiver 600 includes a means, depicted as a module 606, for sending a Status PDU in response to a poll command.

The receiver 600 includes means to interpret a RLC PDU with no data and the poll bit set as a polling command and does not alter its reception buffers upon reception.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such features may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description or the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, transmitter (e.g., access nod) can infer or predict capabilities of a data channel and a receiver (e.g., access terminal) so that polling events are scheduled in an efficient manner as well as selecting a type of poll command based on previous interactions with the same or like machines under similar conditions.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for reliable transmission from a local transmitter to a remote receiver with reduced transmission of data, comprising:
    Transmitting a radio link control command from the local transmitter to the remote receiver; and
    transmitting a polling command by transmission of a subset of previously formed user-plane data, the subset being transmitted in response to detecting a polling event at the local transmitter, and a data size of the subset being less than a data size of the previously formed user-plane data.

2. The method of claim 1, further comprising receiving a status protocol data unit in response to the polling command.

3. The method of claim 1, wherein transmitting the polling command further comprises defining a polling command having an amount of user-plane data as limited by a physical layer allocation.

4. The method of claim 1, wherein transmitting the polling command further comprises using a segmented or resegmented protocol data unit having variable-length data.

5. The method of claim 4, wherein the segmented or resegmented protocol data unit for transmitting polling information also informs of a sequence number transmitted by the local transmitter.

6. The method of claim 4, wherein the segmented or resegmented protocol data unit for transmitting polling information also informs of the highest sequence number transmitted by the local transmitter.

7. The method of claim 4, wherein the segmented or resegmented protocol data unit comprises a length indicator, a segment offset, a segment length and polling fields.

8. The method of claim 4, wherein the segmented or resegmented protocol data unit comprises a pad or piggybacked status protocol data unit field.

9. The method of claim 4, further comprising:
    transmitting a protocol data unit with nonzero-length data and the header portion of a previously transmitted protocol data unit to reduce data content; and
    setting a polling bit of the protocol data unit to indicate the polling command.

10. The method of claim 4, further comprising transmitting a protocol data unit with nonzero-length data and setting the protocol data unit sequence number to an already transmitted sequence number.

11. The method of claim 4, further comprising transmitting a protocol data unit with nonzero-length data and setting the protocol data unit sequence number to the highest transmitted sequence number.

12. The method of claim 4, further comprising transmitting a protocol data unit with nonzero-length data and setting the protocol data unit sequence number to the highest transmitted sequence number incremented by an integer value.

13. The method of claim 4, wherein the transmission of the polling command and nonzero-length data affects the state of a receive buffer.

14. The method of claim 1, wherein transmitting a polling command conforms to High-Speed Packet Access Evolution (HSPA) protocols.

15. The method of claim 1, wherein transmitting a polling command conforms to Third Generation Partnership Project Long Term Evolution (3GPP LTE) protocols.

16. An apparatus for reliable transmission from a local transmitter to a remote receiver with reduced transmission of data, comprising:
    a memory; and
    at least one processor coupled to the memory and configured to:
    transmit a radio link control command from the local transmitter to the remote receiver; and
    transmit a polling command by transmission of a subset of previously formed user-plane data, the subset being transmitted in response to detecting a polling event at the local transmitter, and a data size of the subset being less than a data size of the previously formed user-plane data.

17. A non-transitory computer readable medium for reliable transmission from a local transmitter to a remote receiver with reduced transmission of data, comprising:
    a first set of codes for causing a computer to transmit a radio link control command from the local transmitter to the remote receiver; and
    a second set of codes for causing the computer to transmit a polling command by transmission of a subset of previously formed user-plane data, the subset being transmitted in response to detecting a polling event at the local transmitter, and a data size of the subset being less than a data size of the previously formed user-plane data.

18. An apparatus for reliable transmission from a local transmitter to a remote receiver with reduced transmission of data, comprising:
    means for transmitting a radio link control command from the local transmitter to the remote receiver; and
    means for transmitting a polling command by transmission of a subset of previously formed user-plane data, the subset being transmitted in response to detecting a polling event at the local transmitter, and a data size of the subset being less than a data size of the previously formed user-plane data.

19. An apparatus for reliable transmission from a local transmitter to a remote receiver with reduced transmission of data, comprising:
    the local transmitter for transmitting a radio link control command to a remote receiver; and
    a polling component for transmitting a polling command via the local transmitter by transmission of a subset of previously formed user-plane data, the subset being transmitted in response to detecting a polling event at the local transmitter, and a data size of the subset being less than a data size of the previously formed user-plane data.

20. The apparatus of claim 19, further comprising a local receiver for receiving a status protocol data unit.

21. The apparatus of claim 19, wherein the polling component transmits the polling command by defining a polling command having an amount of user-plane data as minimally permitted by a physical layer allocation.

22. The apparatus of claim 19, wherein the polling component transmits the polling command by using a segmented or resegmented protocol data unit having variable-length data.

23. The apparatus of claim 22, wherein the segmented or resegmented protocol data unit for transmitting polling information also informs of a sequence number transmitted by the local transmitter.

24. The apparatus of claim 22, wherein the segmented or resegmented protocol data unit for transmitting polling information also informs of the highest sequence number transmitted by the local transmitter.

25. The apparatus of claim 22, wherein the segmented or resegmented protocol data unit comprises a length indicator field.

26. The apparatus of claim 22, wherein the segmented or resegmented protocol data unit comprises a pad or piggybacked status protocol data unit field.

27. The apparatus of claim 22, wherein the polling component transmits a protocol data unit with nonzero-length data and the header portion of a previously transmitted protocol data unit to reduce data content, and sets a polling bit of the protocol data unit to indicate a polling command.

28. The apparatus of claim 22, wherein the polling component transmits a protocol data unit with nonzero-length data and sets the protocol data unit sequence number to an already transmitted sequence number.

29. The apparatus of claim 22, wherein the polling component transmits a protocol data unit with nonzero-length data and sets the protocol data unit sequence number to the highest transmitted sequence number.

30. The apparatus of claim 22, wherein the polling component transmits a protocol data unit with nonzero-length data and sets the protocol data unit sequence number to the highest transmitted sequence number incremented by one.

31. The apparatus of claim 22, wherein the polling component transmits the protocol data unit with the polling command and nonzero-length data that does not affect the state of a receive buffer but triggers a buffer status report for all sequence numbers relevant given the indication in a radio link control protocol data unit with the polling command.

32. The apparatus of claim 22, wherein the polling component transmission of the polling command and nonzero-length data affects the state of a receive buffer.

33. The apparatus of claim 19, wherein the polling component transmits a polling command that conforms to High-Speed Packet Access Evolution (HSPA) protocols.

34. The apparatus of claim 19, wherein the polling component transmits a polling command that conforms to Third Generation Partnership Project Long Term Evolution (3GPP LTE) protocols.

35. A method for reliable transmission from a remote transmitter to a local receiver with reduced transmission of data, comprising:
    receiving a radio link control command from the remote transmitter to the local receiver; and
    receiving a polling command by transmission of a subset of previously formed user-plane data, the subset being transmitted in response to a polling event at the remote transmitter, and a data size of the subset being less than a data size of the previously formed user-plane data.

36. The method of claim 35, further comprising transmitting a status protocol data unit.

37. The method of claim 35, wherein receiving the polling command further comprises defining a polling command having an amount of user-plane data as minimally permitted by a physical layer allocation.

38. The method of claim 35, wherein receiving the polling command further comprises using a segmented or resegmented protocol data unit having variable-length data.

39. The method of claim 38, wherein the segmented or resegmented protocol data unit for receiving polling information also informs of a sequence number transmitted by the remote transmitter.

40. The method of claim 38, wherein the segmented or resegmented protocol data unit for receiving polling information also informs of the highest sequence number transmitted by the remote transmitter.

41. The method of claim 38, wherein the segmented or resegmented protocol data unit comprises a length indicator field.

42. The method of claim 38, wherein the segmented or resegmented protocol data unit comprises a pad or piggybacked status protocol data unit field.

43. The method of claim 38, further comprising receiving a protocol data unit with nonzero-length data and the header portion of a previously transmitted protocol data unit to reduce data content and having a polling bit set of the protocol data unit to indicate a polling command.

44. The method of claim 38, further comprising receiving a protocol data unit with nonzero-length data and setting the protocol data unit sequence number to an already transmitted sequence number.

45. The method of claim 38, further comprising receiving a protocol data unit with nonzero-length data and setting the protocol data unit sequence number to the highest transmitted sequence number.

46. The method of claim 38, further comprising receiving a protocol data unit with nonzero-length data and setting the PDU sequence number to the highest transmitted sequence number incremented by one.

47. The method of claim 38, wherein the receiving of the protocol data unit with the polling command and nonzero-length data does not affect the state of a receive buffer, and the receiving of the protocol data unit with the polling command and the nonzero-length data triggers a buffer status report for all sequence numbers relevant given the indication in the radio link control protocol data unit with the polling command.

48. The method of claim 38, wherein the receiving of the polling command and nonzero-length data affects the state of a receive buffer.

49. The method of claim 35, wherein receiving a polling command conforms to High-Speed Packet Access Evolution (HSPA) protocols.

50. The method of claim 35, wherein receiving a polling command conforms to Third Generation Partnership Project Long Term Evolution (3GPP LTE) protocols.

51. An apparatus for reliable transmission from a remote transmitter to a local receiver with reduced transmission of data, comprising:
a memory; and
at least one processor coupled to the memory and configured to:
receive a radio link control command from the remote transmitter to the local receiver; and
receive a polling command by transmission of a subset of previously formed user-plane data, the subset being transmitted in response to a polling event at the remote transmitter, and a data size of the subset being less than a data size of the previously formed user-plane data.

52. A non-transitory computer readable medium for reliable transmission from a remote transmitter to a local receiver with reduced transmission of data, comprising:
a first set of codes for causing a computer to receive a radio link control command from the remote transmitter to the local receiver; and
a second set of codes for causing the computer to receive a polling command by transmission of a subset of previously formed user-plane data, the subset being transmitted in response to a polling event at the remote transmitter, and a data size of the subset being less than a data size of the previously formed user-plane data.

53. An apparatus for reliable transmission from a remote transmitter to a local receiver with reduced transmission of data, comprising:
means for receiving a radio link control command from the remote transmitter to the local receiver; and
means for receiving a polling command by transmission of a subset of previously formed user-plane data, the subset being transmitted in response to a polling event at the remote transmitter, and a data size of the subset being less than a data size of the previously formed user-plane data.

54. An apparatus for reliable transmission from a remote transmitter to a local receiver with reduced transmission of data, comprising:
the local receiver for receiving a radio link control command from the remote transmitter; and
a polling component for receiving a polling command via the local receiver having transmission of a subset of previously formed user-plane data, the subset being transmitted in response to a polling event at the remote transmitter, and a data size of the subset being less than a data size of the previously formed user-plane data.

55. The apparatus of claim 54, further comprising a local transmitter for transmitting a status protocol data unit.

56. The apparatus of claim 54, wherein the polling component receives the polling command having an amount of user-plane data as minimally permitted by a physical layer allocation.

57. The apparatus of claim 54, wherein the polling component receives the polling command as a segmented or resegmented protocol data unit having variable-length data.

58. The apparatus of claim 57, wherein the segmented or resegmented protocol data unit for receiving polling information also informs of a sequence number transmitted by the remote transmitter.

59. The apparatus of claim 57, wherein the segmented or resegmented protocol data unit for receiving polling information also informs of the highest sequence number transmitted by the remote transmitter.

60. The apparatus of claim 57, wherein the segmented or resegmented protocol data unit comprises a length indicator field.

61. The apparatus of claim 57, wherein the segmented or resegmented protocol data unit comprises a pad or piggybacked status protocol data unit field.

62. The apparatus of claim 57, wherein the polling component receives a protocol data unit with nonzero-length data and the header portion of a previously transmitted protocol data unit to reduce data content, and a polling bit set of the protocol data unit to indicate a polling command.

63. The apparatus of claim 57, wherein the polling component receives a protocol data unit with nonzero-length data and the protocol data unit sequence number set to an already transmitted sequence number.

64. The apparatus of claim 57, wherein the polling component receives a protocol data unit with nonzero-length data and the protocol data unit sequence number set to the highest transmitted sequence number.

65. The apparatus of claim 57, wherein the polling component receives a protocol data unit with nonzero-length data and the protocol data unit sequence number set to the highest transmitted sequence number incremented by one.

66. The apparatus of claim 57, wherein the polling component receives the protocol data unit with the polling command and nonzero-length data that does not affect the state of a receive buffer, and the receiving of the protocol data unit with the polling command and the nonzero-length data triggers a buffer status report for all sequence numbers relevant given the indication in the radio link control protocol data unit with the polling command.

67. The apparatus of claim 57, wherein the polling component receives the polling command and nonzero-length data that affects the state of a receive buffer.

68. The apparatus of claim 54, wherein the polling component receives a polling command that conforms to High-Speed Packet Access Evolution (HSPA) protocols.

69. The apparatus of claim 54, wherein the polling component receives a polling command that conforms to Third Generation Partnership Project Long Term Evolution (3GPP LTE) protocols.

* * * * *